Oct. 3, 1961 D. L. BABCOCK 3,003,058
COMBINED LAMP AND REFLECTOR WITH SOCKET
Filed Sept. 17, 1958
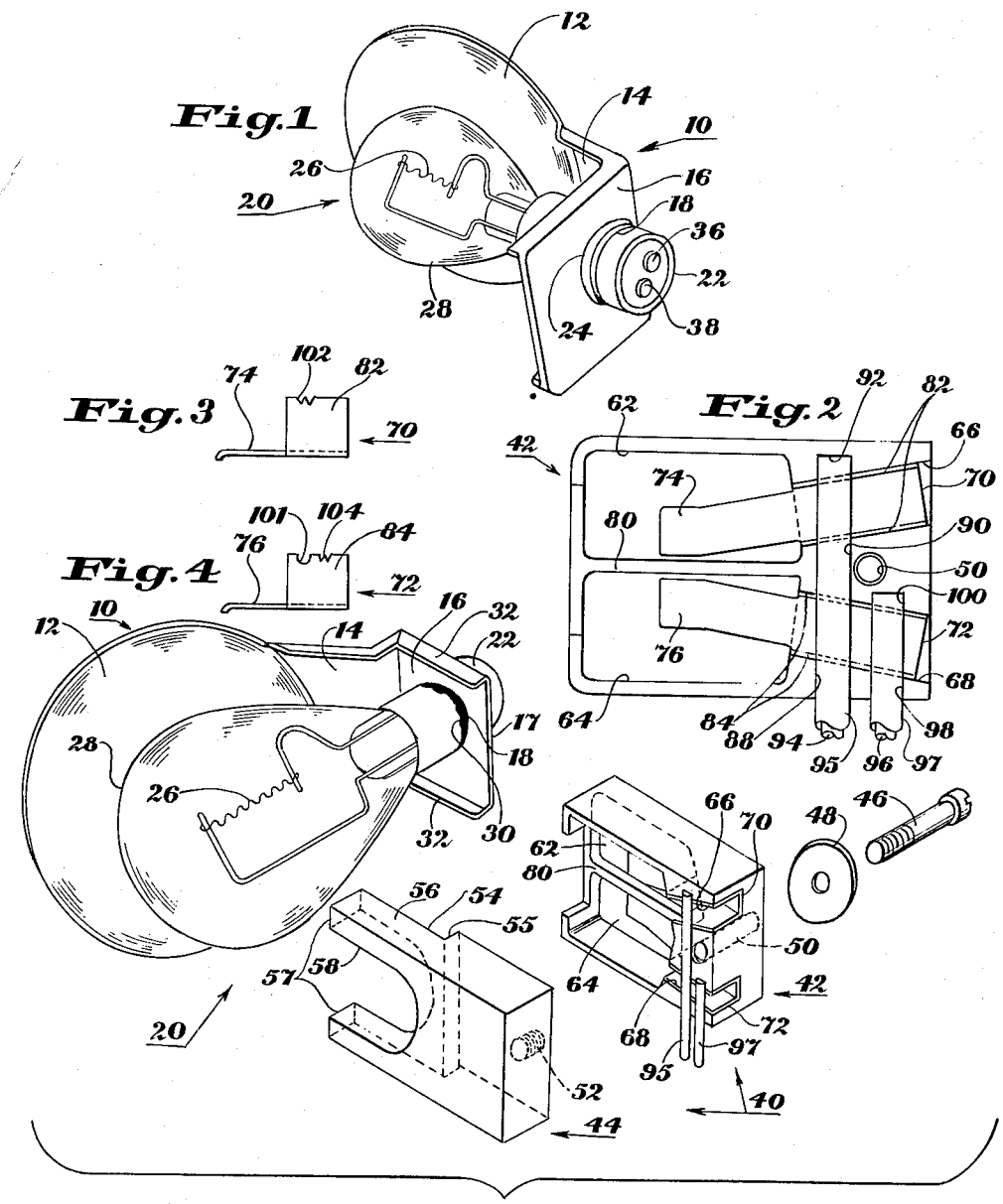
David L. Babcock
INVENTOR.
BY R. Frank Smith
Robert W. Hampton
ATTORNEYS

United States Patent Office 3,003,058
Patented Oct. 3, 1961

3,003,058
COMBINED LAMP AND REFLECTOR WITH SOCKET
David L. Babcock, Rochester, N.Y., assignor to Eastman Kodak Company, Rochester, N.Y., a corporation of New Jersey
Filed Sept. 17, 1958, Ser. No. 761,568
2 Claims. (Cl. 240—41.35)

The present invention concerns optical projectors and more particularly concerns a unitized lamp and reflector and a complementary socket for use in such projectors.

In motion picture and other apparatus wherein a filament lamp and a reflector are used to direct a beam of light, it is important to produce a maximum of useful light with a minimum of heat generation and cost. One manner of minimizing the latter two factors is to minimize the lamp wattage. In general, the lamp wattage required for a given light output is at a minimum when the lamp filament is located in its optimum position relative to the reflector.

In the usual projector the reflector is treated as a permanent element and the lamp as a replaceable element, and these elements are separately mounted on one or more structural members. Among such projectors of a single design, using commercially purchased lamps, the substantially nonuniformity of the positions of the lamp filaments results in a wide range of efficiencies. This is true even though provision is made for manual adjustment of the position of the lamp and/or reflector. Consequently, it is necessary to design such projectors for a relatively high lamp wattage in order to insure that each projector of that design will produce a predetermined minimum output of light.

It is, therefore, a principal object of the invention to reduce the lamp wattage required for uniformly and efficiently producing a predetermined output of light in each unit of a population of optical projectors having a common design. This object is realized by permanently securing the lamp to the reflector during the manufacturing process, with the lamp filament located in the optimum position relative to the reflecting surface.

It is a further object of the invention to provide an easily manufactured, highly efficient light source for optical projectors.

A further object of the invention is to permanently unite a lamp to a reflector that is so inexpensive as to be economically disposable along with the lamp.

Another object is to form a reflector with an integral base extending forwardly from the reflecting surface, the base being adapted to hold a lamp permanently in fixed relation to the reflecting surface.

Another object is to provide a socket adapted to receive a permanently combined lamp and reflector and to hold the same firmly in fixed relation to the socket.

A further object is to provide complementary surfaces on a socket and a permanently combined lamp and reflector, such that the lamp and reflector combination is easily insertable into the socket with a substantially entirely linear motion to establish firm contact between electrical terminals on the lamp and socket and to retain the lamp and reflector combination firmly in a fixed position relative to the socket.

Other objects of the invention will appear from the following description, reference being made to the accompanying drawing, wherein:

FIG. 1 is a perspective view of the combined lamp and reflector, showing the bottom of the lamp base;
FIG. 2 is a top view of the socket base;
FIG. 3 is a side view of a first socket terminal;
FIG. 4 is a side view of the second socket terminal; and
FIG. 5 is an exploded perspective view of the combined lamp and reflector and the socket base and cover.

Referring to FIGS. 1 and 5, the reflector unit 10 includes an integral reflecting surface 12 which, in its preferred form, has a substantially spherical contour. The reflecting surface is integral with an extension 14 lying in the general plane of the reflecting surface. Extension 14 is integral with a base member 16 extending forwardly from the reflecting surface. The entire reflector unit 10 may be formed from a single sheet of stock, such as aluminum, or it may be cast, or it may be molded, for example, from a suitable plastic such as cellulose acetate butyrate, or other synthetic material capable of withstanding the heat generated by the lamp, with a metallic or other reflecting surface deposited or otherwise applied to the plastic.

A circular aperture 18 in the reflector base 16 is adapted to receive the circular base 22 of a lamp 20 and may be provided with a collar 24 for helping to support and position the lamp base. The base 22 and aperture 18 need not be circular, but the aperture may be slightly larger than base 22 to permit adjustment of the position of the lamp in the reflector. Lamp 20 further includes the usual filament 26 enclosed in a transparent envelope 28, the filament and envelope both being secured to the lamp base.

To unite the lamp and reflector, lamp base 22 is inserted into aperture 18 and is adjusted relative to the reflector base 16 until filament 26 is in its optimum position relative to the reflecting surface 12. Then the lamp base is permanently secured to the reflector base, for example, by soldering or welding, as indicated at 30 in FIG. 5. The optimum location of filament 26 may be determined by visually centering it over the reflecting surface 12, or it may be determined with the lamp energized, by visually estimating the best focus or maximum light on a target or photocell (not shown) in front of the reflector.

The combined lamp and reflector cooperate with a socket 40 (FIG. 5) having a base member 42 (see also FIG. 2) and a cover member 44. Members 42 and 44 are preferably molded of electrical insulating material and are clamped together by a bolt 46 that extends through a washer 48 and through a hole 50 in member 42 into threading engagement with a hole 52 in member 44. When the two socket members 42 and 44 are thus clamped together, a relieved portion 54 on the lower surface of cover member 44 forms a slot for receiving the reflector base 16. As best shown in FIG. 5, the reflector base has a pair of side flanges 32 which are guided along the respective lateral surfaces 56 of the socket member 44 to thereby accurately located the combined lamp and reflector relative to the sides of the socket. The lamp base 22 is adapted to enter a slot 58 in socket member 44. The depth to which the combined lamp and reflector enter the socket may be limited accurately, for example by the engagement of reflector extension 14 with end surfaces 57 of member 44 (the preferred embodiment), or engagement of the front surface 17 of reflector base 16 with offset surface 55 of member 44, or by engagement of any other suitable complementary surfaces on the reflector and socket, such as one or more pins (not shown) in one member engaging respective indexing holes (not shown) in the other member, the pins and holes extending transversely to base member 16.

Base member 42 of the socket has a pair of channels 62 and 64 having respective divergent narrow ends 66 and 68 adapted to receive respective terminal members 70 and 72 (see also FIGS. 3 and 4). Members 70 and 72 have respective leaf-spring ends 74 and 76 extending into the wider portions of channels 62 and 64 for contact with respective terminals 36 and 38 (FIG. 1) on the bottom of the lamp base. Terminal ends 74 and 76

(FIGS. 2 to 5) are prevented from touching each other by a separator 80 formed integrally with the bottom of the socket base 42.

Terminals 70 and 72 are connected to a power source by means of respective vertical sides 82 and 84 which cooperate with a pair of power leads, or wires, 94 and 96, insulated as shown at 95 and 97, respectively. The socket base has two aligned groups of U-shaped grooves, each adapted to receive one of the wires 94 and 96. Three grooves 88, 90 and 92 (FIG. 2), which receive wire 94, extend in a line from a first side of the socket base through the narrow ends 68 and 66 of channels 64 and 62, respectively, and toward the opposite side of the socket base. A pair of grooves 98 and 100, which receive wire 96, extend in a line from said first side of the socket member across the narrow end 68 of channel 64 and toward channel 62.

The sides 84 (FIGS. 2 and 4) of terminal 72 have respective grooves 101 aligned with grooves 88, 90, and 92 to receive wire 94, and have respective prongs 104 aligned with grooves 98 and 100 for penetrating insulation 97 on wire 96 to establish electrical contact between terminal 72 and wire 96. The penetration of insulation 97 by prongs 104 occurs when the socket cover 44 is clamped to base 42 by bolt 46. Similarly, sides 82 of terminal 70 have respective prongs 102 aligned with grooves 88, 90, 92 and 101 and penetrate insulation 95 on wire 94 to establish contact between the latter wire and terminal 74.

The invention has been described in detail with particular reference to preferred embodiments thereof, but it will be understood that variations and modifications can be effected within the spirit and scope of the invention as described hereinabove and as defined in the appended claims.

I claim:
1. An inexpensive and readily serviced projection lighting arrangement comprising a socket having a pair of flexible electrical contact elements positioned in side-by-side insulated relation and in generally the same plane, said socket having means forming a first slot generally parallel to the plane of said contacts and extending longitudinally into the socket from one end thereof, said socket having means forming a second slot communicating with said first slot and extending in a direction generally perpendicular thereto, both slots extending into the same end of the socket, a flat, apertured lamp-mounting member removably positioned in said first slot, an incandescent lamp extending from one surface of said member through said second slot, said lamp having a filament and having a base extending through an aperture in said member, with electrical contacts on said base connected to the lamp filament and establishing an electrical connection from the filament to the contacts in the socket, flanges extending from the lateral edges of said member and lying closely along complementary edge surfaces of said socket adjacent said first slot to position said member laterally relative to the socket, a reflector support integral with said member and having a surface abutting an end surface of the socket to position said member longitudinally relative to the socket, and a concave reflector integral with said support with its concave surface facing said lamp.

2. A lighting unit of the projection type comprising a reflector having an integral extension lying substantially in the general plane of the reflector, said reflector having a concave surface having light reflecting characteristics, an apertured member integral with said extension and projecting out of the plane of the reflector on the side thereof provided with said reflecting surface, said extension and member having along each lateral edge thereof a continuous flange for strengthening and mounting purposes, an incandescent lamp having a filament and having a base extending through and permanently fixed to the apertured member, with the filament of said lamp at a predetermined optimum position for focusing cooperation with said light reflecting surface, and electrical contacts on said base connected to the filament and lying on the side of the apertured member remote from the filament.

References Cited in the file of this patent

UNITED STATES PATENTS

| | | |
|---|---|---|
| 1,471,710 | Shanahan | Oct. 23, 1923 |
| 2,225,816 | Anklam | Dec. 24, 1940 |
| 2,332,770 | Abernathy | Oct. 26, 1943 |
| 2,496,680 | Schwartz | Feb. 7, 1950 |
| 2,508,242 | Finkelstein | May 16, 1950 |
| 2,571,294 | Sale et al. | Oct. 16, 1951 |
| 2,575,790 | Braunsdorff | Nov. 20, 1951 |
| 2,638,534 | Horaden | May 12, 1953 |